(12) United States Patent
Motohashi

(10) Patent No.: US 8,033,734 B2
(45) Date of Patent: Oct. 11, 2011

(54) VEHICLE-WHEEL ROLLING BEARING

(75) Inventor: Nobutsuna Motohashi, Katsuragi (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 344 days.

(21) Appl. No.: 12/312,506

(22) PCT Filed: Nov. 14, 2007

(86) PCT No.: PCT/JP2007/072130
§ 371 (c)(1),
(2), (4) Date: May 14, 2009

(87) PCT Pub. No.: WO2008/059899
PCT Pub. Date: May 22, 2008

(65) Prior Publication Data
US 2009/0310897 A1  Dec. 17, 2009

(30) Foreign Application Priority Data
Nov. 16, 2006  (JP) ................................ P2006-309999

(51) Int. Cl.
*F16C 19/52* (2006.01)
(52) U.S. Cl. ........................................ 384/448; 384/544
(58) Field of Classification Search .................. 384/544, 384/589, 448
See application file for complete search history.

(56) References Cited

U.S. PATENT DOCUMENTS

| | | | |
|---|---|---|---|
| 2002/0141673 A1* | 10/2002 | Ito et al. | 384/448 |
| 2005/0031239 A1* | 2/2005 | Aoki et al. | 384/448 |
| 2006/0228063 A1 | 10/2006 | Sentoku et al. | |

FOREIGN PATENT DOCUMENTS

| | | |
|---|---|---|
| JP | 2002-340922 | 11/2002 |
| JP | 2003-120770 | 4/2003 |
| JP | 2004-198247 | 7/2004 |
| JP | 2005-49159 | 2/2005 |
| JP | 2005-266481 | 9/2005 |
| JP | 2005-322651 | 11/2005 |
| JP | 2006-181956 | 7/2006 |
| JP | 2006-292489 | 10/2006 |
| JP | 2007-78073 | 3/2007 |
| JP | 2007-127253 | 5/2007 |

* cited by examiner

*Primary Examiner* — Thomas R Hannon
(74) *Attorney, Agent, or Firm* — McGinn IP Law Group, PLLC

(57) ABSTRACT

To provide a vehicle-wheel rolling bearing capable of further improving the reliability of a sensor by preventing a temperature drift.
A vehicle-wheel rolling bearing H includes a cylindrical fixed ring 1 which is fixed to a vehicle body; rotary rings 2 and 3 which are inserted through the fixed ring 1 so as to be rotatable therein; and plural rows of rolling elements 5 which are disposed between the fixed ring and the rotary ring so as to roll. A vehicle-outboard-side end of an annular sensor housing 16 having plural displacement sensors 24 disposed in a circumferential direction thereof so as to detect a gap with respect to the outer peripheral surface of each vehicle-inboard-side end of the rotary rings 2 and 3 is press-fitted to the inner peripheral surface of the vehicle-inboard-side end of the fixed ring 1. In addition, the displacement sensors 24 are coated by a synthetic resin or a rubber-based material so as to be integrally formed with the sensor housing 16.

4 Claims, 16 Drawing Sheets

FIG. 11(a)
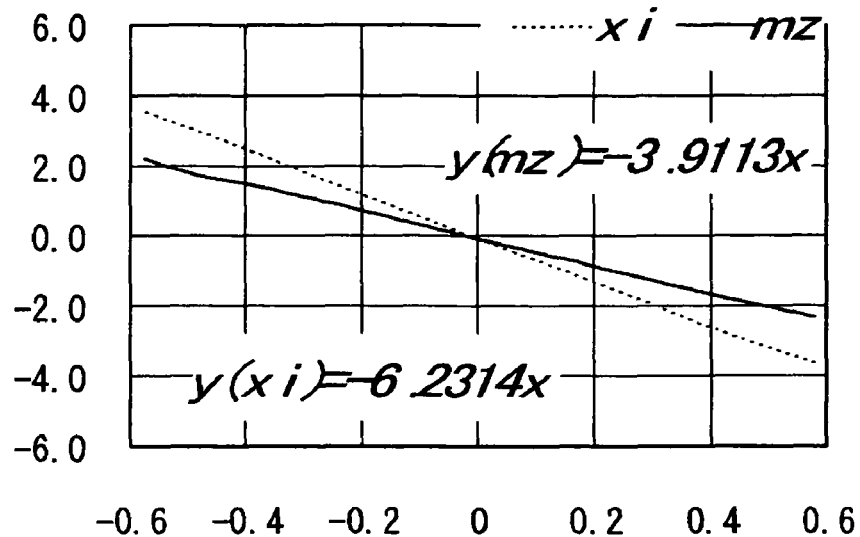
FIG. 11(b)
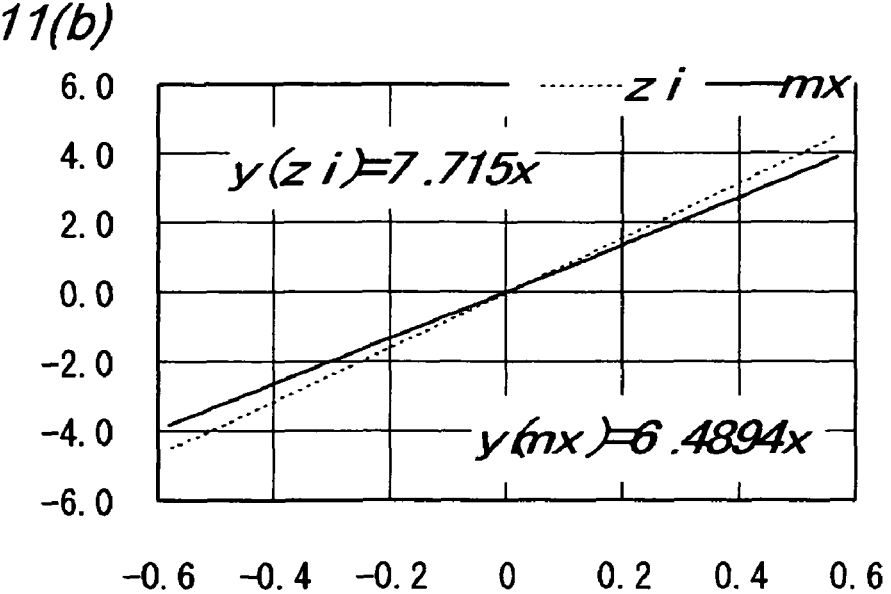
FIG. 11(c)
$$\begin{pmatrix} kz = y_{(xi)} / y_{(mz)} \\ kx = y_{(zi)} / y_{(mx)} \end{pmatrix}$$

VEHICLE-WHEEL ROLLING BEARING

TECHNICAL FIELD

The present invention relates to a vehicle-wheel rolling bearing. More particularly, the present invention relates to a vehicle-wheel rolling bearing which is used for a vehicle such as an automobile and has a sensor for obtaining information from a vehicle wheel of the vehicle.

BACKGROUND ART

In recent years, an automobile requires various information such as a load acting on a vehicle wheel or a rotation speed of the vehicle wheel in order to carry out a driving control in a traveling mode. In order to obtain such information, there is proposed a technique in which a sensor is provided in a vehicle-wheel rolling bearing attached with a vehicle wheel of an automobile.

As the known vehicle-wheel rolling bearing, there is a bearing including a cylindrical fixed ring which is fixed to a vehicle body; a rotary ring which is provided in the fixed ring in an inner radial direction so as to attach a vehicle wheel thereto; and plural rows of rolling elements which are provided between the fixed ring and the rotary ring so as to roll. In the bearing, the above-described sensor is provided in the fixed ring, and the information of the rotary ring is obtained from the sensor.

In the bearing, a through hole is formed through the fixed ring in a radial direction, and the sensor is inserted into the through hole. In addition, a measurement portion of the sensor is opposed to the outer peripheral surface of the rotary ring so that the sensor acquires the information of the rotary ring.

However, in the vehicle-wheel rolling bearing, it is necessary to form plural through holes in the fixed ring in order to provide plural sensors in the fixed ring. In this case, another penetration process is required in the manufacture process of the fixed ring, and the through holes are respectively required to be equipped with the sensors, thereby complicating the assembling process. In addition, it is necessary to adjust a gap between the sensor and the rotary ring in every sensor. As a result, a problem arises in that the number of assembling processes increases.

DISCLOSURE OF THE INVENTION

Problem that the Invention is to Solve

In the vehicle-wheel rolling bearing, for example, when an ambient temperature increases, a temperature expansion difference occurs between the sensor housing and the fixed ring because a synthetic resin and a rubber-based material used to coat the sensor housing (which is generally formed of aluminum), the fixed ring, and the displacement sensors have different linear expansion coefficients. At this time, one end (on the vehicle-outboard side) of the sensor housing is fixed to the vehicle-inboard-side end of the fixed ring by a fixed screw. However, in the method of fixing the sensor housing at the same interval in a circumferential direction by the fixed screw, a uniform fastening force using the screw is difficult to be obtained in the entire fixed positions and a difference occurs in the fastening forces in a circumferential direction.

As a result, the sensor housing integrally formed with the synthetic resin or rubber-based material having a large linear expansion coefficient is expanded in a biased manner in a circumferential direction. Accordingly, a deviation occurs between the displacement sensor and a sensor target, and a displacement of the target occurs due to the temperature differently from a displacement caused by the load. For this reason, even in the state where the load does not act in actual, a temperature drift may occur due to the erroneous output signal of the sensor. Accordingly, it is important to restrict the drift.

The present invention relates to a further improvement of the above-described vehicle-wheel rolling bearing, and an object of the invention is to provide the vehicle-wheel rolling bearing capable of further improving the reliability of the sensor by preventing occurrence of the temperature drift.

Means for Solving the Problem

According to an aspect of the invention, there is provided a vehicle-wheel rolling bearing including: a cylindrical fixed ring which is fixed to a vehicle body; a rotary ring which is inserted through the fixed ring so as to be rotatable therein; and plural rows of rolling elements which are disposed between the fixed ring and the rotary ring so as to roll, wherein a vehicle-outboard-side end of an annular sensor housing, having a plurality of displacement sensors disposed in a circumferential direction so as to detect a gap with respect to an outer peripheral surface of a vehicle-inboard-side end of the rotary ring, is press-fitted to an inner peripheral surface of a vehicle-inboard-side end of the fixed ring, and wherein the displacement sensors are coated by a synthetic resin or a rubber-based material and is integrally formed with the sensor housing.

In the vehicle-wheel rolling bearing according to the invention, since the vehicle-outboard-side end of the sensor housing is press-fitted to the inner peripheral surface of the vehicle-inboard-side end of the fixed ring, it is possible to uniformly fix the sensor housing in a circumferential direction. Accordingly, even when the sensor housing is expanded due to an increased ambient temperature, it is possible to uniformly restrain the expansion in a circumferential direction. Accordingly, it is possible to prevent the axial deviation of the sensor housing caused by the expansion. As a result, it is possible to improve the reliability of the sensor by preventing a temperature drift.

In the vehicle-wheel rolling bearing having the above-described configuration, the sensor housing may be formed of aluminum and the synthetic resin or the rubber-based material may be mixed with alumina powders. With such a configuration, in the case of the mixture of alumina, since the linear expansion coefficient of the synthetic resin or the rubber-based material can be approximated to the linear expansion coefficient of aluminum forming the sensor housing, it is possible to decrease the temperature expansion of the synthetic resin or the rubber-based material. Accordingly, it is possible to further prevent the axial deviation of the sensor housing due to the expansion.

In the vehicle-wheel rolling bearing having the above-described configuration, a lid member which is formed of a material harder than the sensor housing may be fitted to the outside of a vehicle-inboard-side end of the sensor housing. Since the vehicle-inboard-side end of the sensor housing is restrained by fitting the lid member, which is formed of a material harder than the sensor housing, to the outside thereof, it is possible to restrict the temperature expansion of the sensor housing and to further prevent the axial deviation of the sensor housing due to the expansion.

Advantage of the Invention

In the vehicle-wheel rolling bearing according to the invention, it is possible to further improve the reliability of the sensor by preventing occurrence of the temperature drift.

BRIEF DESCRIPTION OF THE DRAWINGS

FIG. 11($a$) is a line graph of mz and xi in a pure moment state, FIG. 11($b$) is a line graph of mx and zi in a pure moment state, and FIG. 11($c$) is an equation showing a calculation method of correction coefficients kz and kx.

BEST MODE FOR CARRYING OUT THE INVENTION

Hereinafter, a vehicle-wheel rolling bearing (hereinafter, simply referred to as a bearing) according to an embodiment of the invention will be described in detail with reference to the accompanied drawings.

Figure 1:
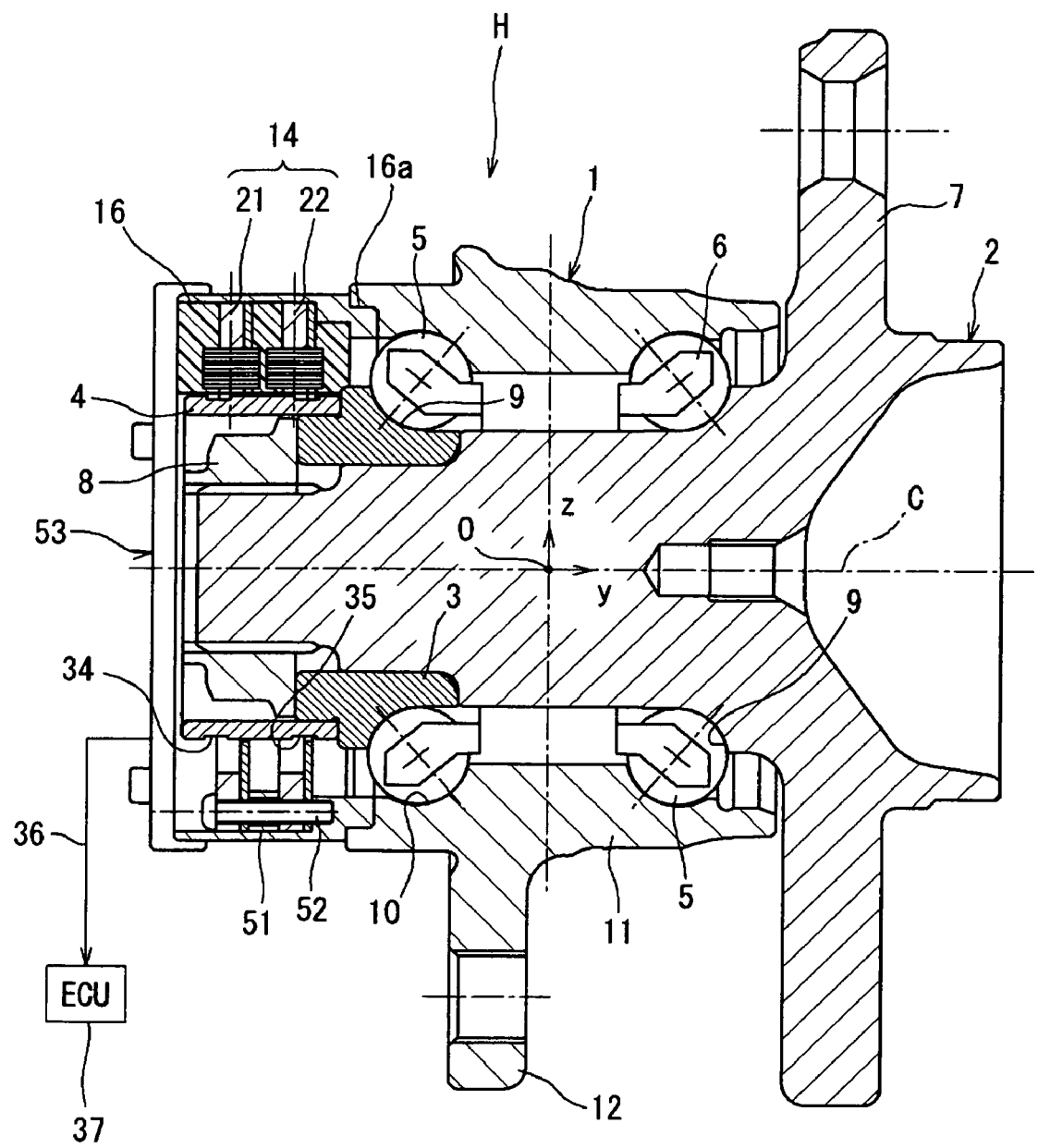
FIG. 1 is an axial sectional view showing a bearing according to an embodiment of the invention.
Figure 2:
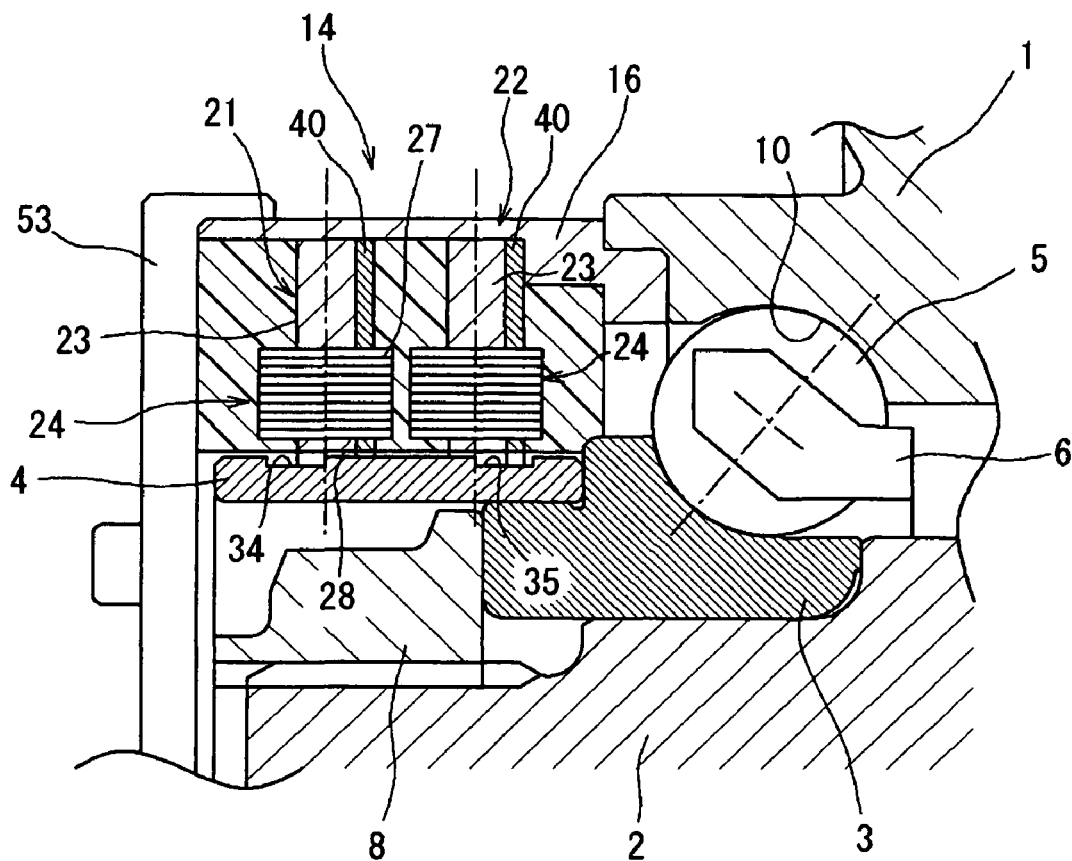
FIG. 2 is a partially enlarged view showing the bearing in FIG. 1.

FIG. 1 is an axial sectional view showing a bearing according to an embodiment of the invention. FIG. 2 is a partially enlarged view showing the bearing in FIG. 1. In addition, in FIGS. 1, 2, and 15, the right side is a vehicle-outboard side (the outside of the vehicle) and the left side is a vehicle-inboard side (the inside of the vehicle).

(Overall Structure of Bearing)

As shown in FIG. 1, a bearing H according to this embodiment includes a cylindrical outer ring 1; an inner shaft 2 which is rotatably inserted through the outer ring 1; an inner ring member 3 which is fitted to the outside of a vehicle-inboard-side end of the inner shaft 2; a sensor target 4 which is fitted to the outside of a vehicle-inboard-side end of the inner ring member 3; and plural rows of rolling elements 5 and 5 which are formed by plural balls arranged in a circumferential direction, thereby forming a plural-row angular ball bearing part. The balls in each row as the rolling elements 5 and 5 are held by a holder 6 so as to have a uniform interval in a circumferential direction.

Figure 14:
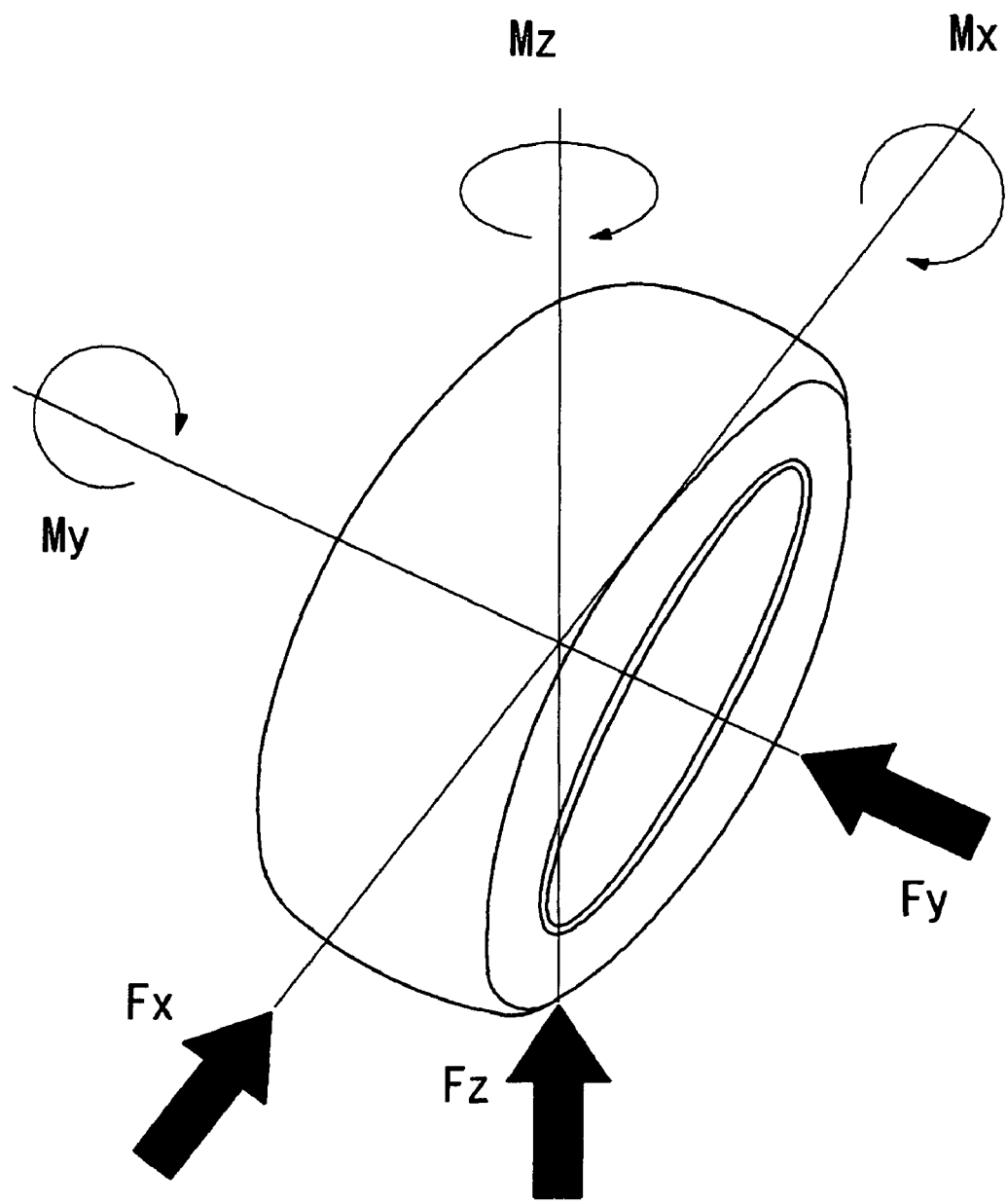
FIG. 14 is a perspective view of a vehicle wheel showing the definition of the loads in the x-axis, y-axis, and z-axis directions.

In addition, in this specification, a direction taken along a central axis C of the bearing H indicates a y-axis direction, a horizontal direction perpendicular to the y-axis direction and penetrating a paper surface indicates an x-axis direction, and a vertical direction perpendicular to the y-axis direction and the x-axis direction indicates a z-axis direction. Accordingly, as shown in FIG. 14, the x-axis direction is a longitudinal horizontal direction of the vehicle wheel, the y-axis direction is a transverse horizontal direction (axial direction) of the vehicle wheel, and the z-axis direction is a vertical direction.

In the bearing H according to this embodiment, the outer ring 1 is a fixed ring which is fixed to a vehicle body. Meanwhile, the inner shaft 2, the inner ring member 3, and the sensor target 4 form a vehicle-wheel-side rotary ring, and the plural rows of rolling elements 5 and 5 are interposed between the fixed ring and the rotary ring so as to roll. Accordingly, the fixed ring and the rotary ring are coaxially disposed, and the rotary ring is configured to be rotatable about the fixed ring together with the vehicle wheel (a tire and a tire wheel shown in FIG. 14).

The inner shaft 2 forming the rotary ring includes a flange portion 7 which is formed on the vehicle-outboard side thereof so as to extend outward in a radial direction, and the flange portion 7 is formed as an attachment portion of a tire wheel of the vehicle wheel or a brake disk. The tire wheel or the like is attached to the flange portion 7 by an attachment bolt (not shown). The inner ring member 3 is fitted to the outside of a stepped portion formed on the vehicle-inboard side of the inner shaft 2, and is fixed to the inner shaft 2 by a nut 8 threaded into the vehicle-inboard-side end of the inner shaft 2. In addition, the outer peripheral surfaces of the inner shaft 2 and the inner ring member 3 are provided with inner raceway surfaces 9 and 9 of the rolling elements 5 and 5.

The outer ring 1 forming the fixed ring includes a cylindrical body cylinder portion 11 of which the inner peripheral surface is provided with outer raceway surfaces 10 and 10 of the rolling elements 5 and 5. The flange portion 12 is fixed to a knuckle (not shown) forming a suspension device as a vehicle-body-side member, thereby fixing the bearing H to the vehicle body.

The bearing H according to this embodiment includes a sensor device 14 which detects a physical amount (in this embodiment, an inductance varying in accordance with a gap with respect to the outer peripheral surface of the sensor target 4) varying in accordance with a displacement of the outer peripheral surface of the sensor target 4 provided in the rotary ring and a sensor housing 16 which is used to fix the sensor device 14 to the outer ring 1 as the fixed ring. The sensor housing 16 is formed by a cylindrical member having a short cylindrical shape or a short annular shape, and the cylindrical member is formed by a cylindrical metallic member which is short in an axial direction. As the metallic member, it is desirable to use a nonmagnetic material, for example, aluminum or the like in order to prevent the deterioration of the reliability of the sensor device 14 when the sensor housing 16 is magnetized during a long-time use.

The outer periphery of the vehicle-outboard-side end of the sensor housing 16 is provided with a stepped portion 16a. The vehicle-outboard-side end of the sensor housing 16 is press-fitted to (fitted to the inside of) the inner peripheral surface of the vehicle-inboard-side end of the outer ring 1 so that the stepped portion 16a engages with the vehicle-inboard-side end of the outer ring 1. Accordingly, it is possible to uniformly fix the sensor housing 16 in a circumferential direction. Even when the sensor housing 16 is expanded due to an increased ambient temperature, it is possible to uniformly restrain the expansion in a circumferential direction. As a result, it is possible to prevent the axial deviation of the sensor housing 16 caused by the expansion. In addition to the fixing operation using the above-described press-fitting operation, an additional or auxiliary fixed screw may be used.

The inner peripheral side of the sensor housing 16 is equipped with a sensor device 14 which detects a gap between itself and the outer peripheral surface of the sensor target 4 attached to the inner end of the inner shaft 2.

A lid member 53 which is formed of a material harder than that of the sensor housing 16 is fitted to the outside of the vehicle-inboard-side end of the sensor housing 16. In the case where the sensor housing 16 is formed of aluminum, the lid member 53 may be formed of an iron-based material (for example, S45C or S55C) which are harder than aluminum. Since the vehicle-inboard-side end of the sensor housing 16 is restrained by fitting the lid member 53, which is formed of a material harder than the sensor housing 16, to the outside thereof, it is possible to restrict the temperature expansion of the sensor housing 16 and to further prevent the axial deviation of the sensor housing 16 due to the expansion. In addition, in order to ensure the rust resistance, an SUS-based material may be used instead of the iron-based material.

(Structure of Sensor Device)

Figure 3:
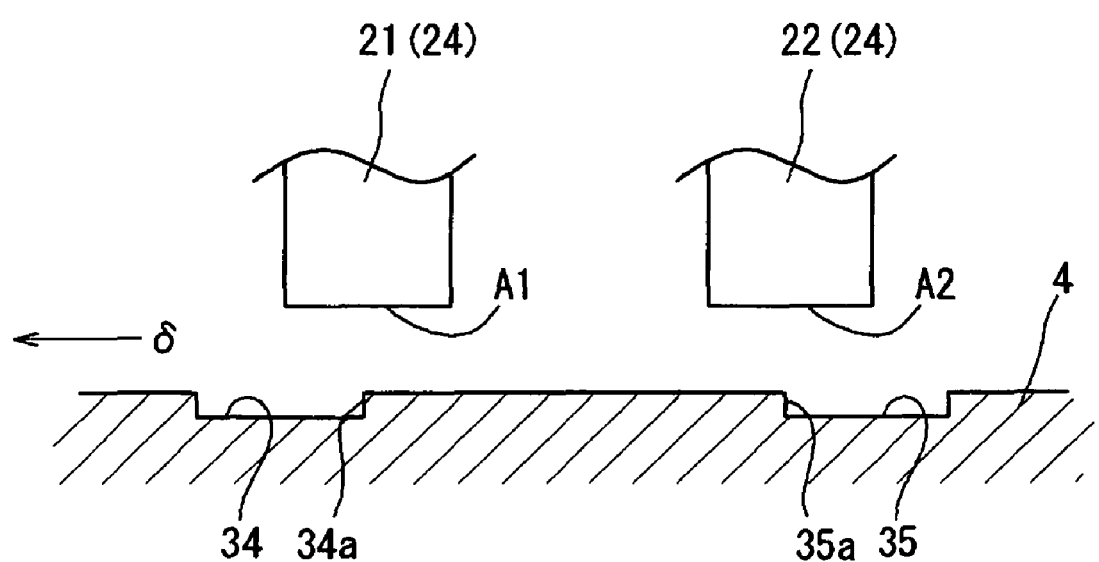
FIG. 3 is a view showing a positional relationship between a displacement sensor and a stepped portion of the bearing in FIG. 1.
Figure 4:
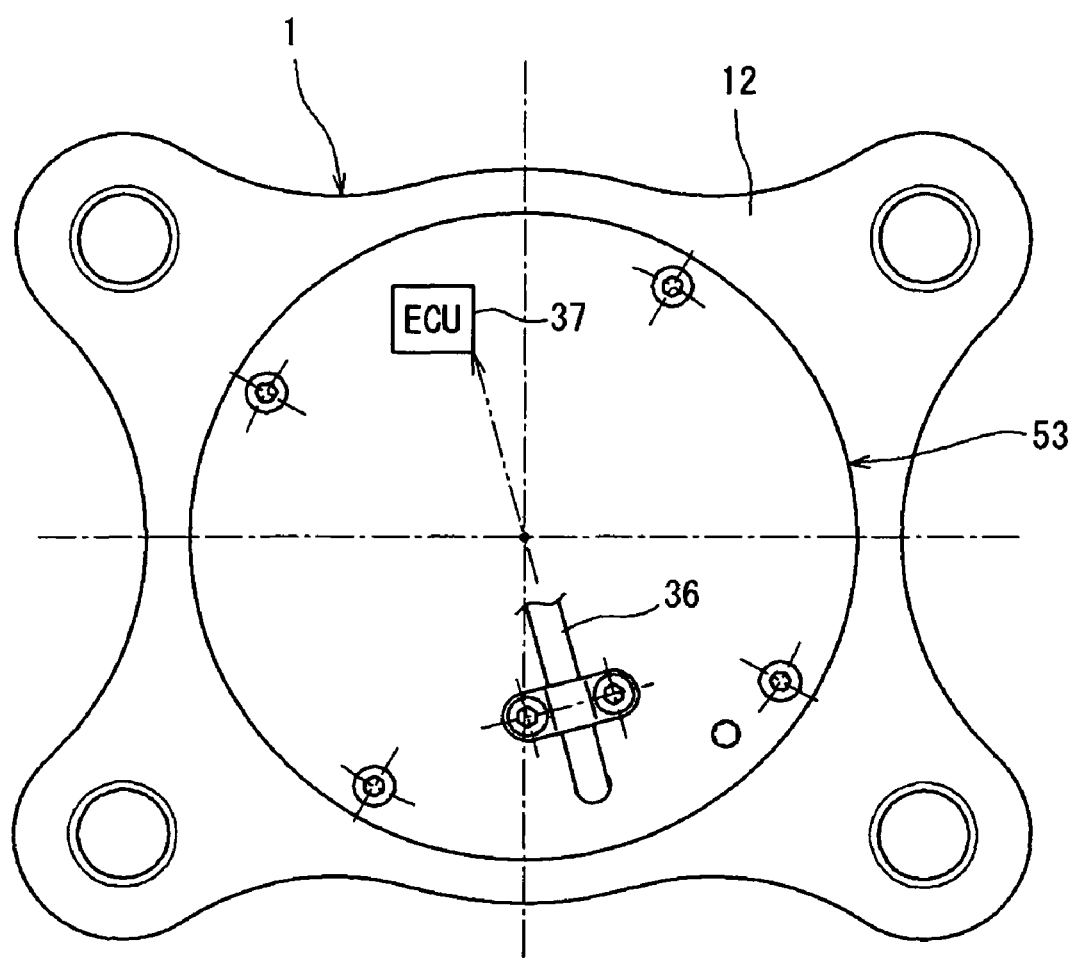
FIG. 4 is a view showing the bearing in FIG. 1 when viewed from the inner side thereof.
Figure 5:
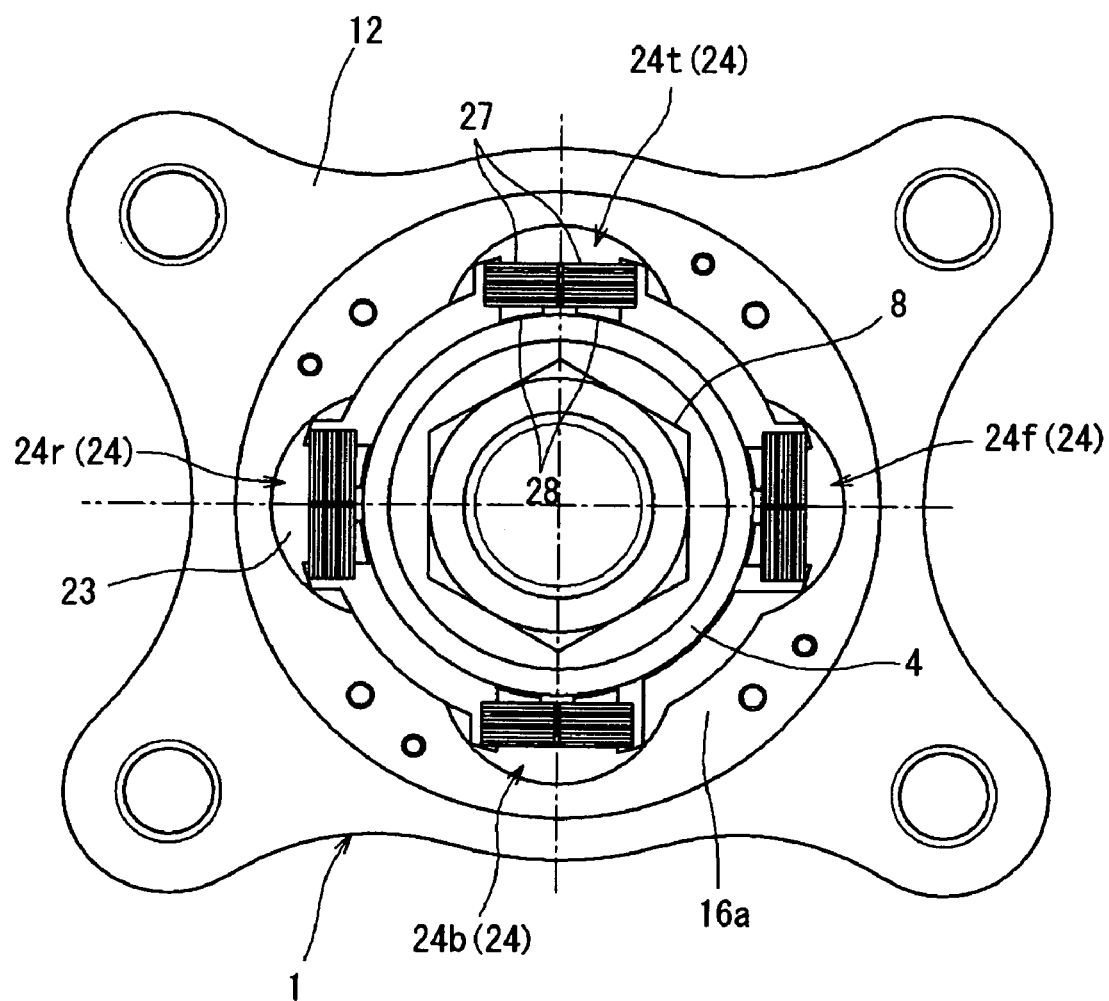
FIG. 5 is a view showing the bearing in FIG. 1 when viewed from the inner side thereof in the state where an inner seal device is separated therefrom.

As shown in FIGS. 3 and 5, the sensor device 14 according to this embodiment includes a first sensor member 21 and a second sensor member 22 which respectively detect a gap at a position distanced from the outer peripheral surface of the sensor target 4 in an axial direction. In this specification, in the sensor device 14 and the sensor target 4, "the first" indicates the vehicle-inboard side and "the second" indicates the vehicle-outboard side.

Each of the first and second sensor members 21 and 22 is formed by an inductance-type displacement sensor which detects a variation in the gap with respect to the outer peripheral surface of the sensor target 4 by means of a variation in the inductance, and includes two rows of annular sensor cores 23 which are distanced from each other in an axial direction and are attached to the inner periphery of the sensor housing 16 and plural displacement sensors 24 which are disposed in a circumferential direction of the sensor core 23 so as to have a predetermined interval therebetween. Each sensor core 23 is fixed to the sensor housing 16 by a fixed screw 52 (see FIG. 1) with a cylindrical spacer 51 interposed therebetween.

Each displacement sensor 24 of the first and second sensor members 21 and 22 is disposed at four positions in a longitudinal direction and a vertical direction so as to detect a variation in the gap between the rotary ring and the outer peripheral surface of the sensor target 4 in the x-axis direction and the z-axis direction.

That is, the first vehicle-inboard-side sensor member 21 includes a first front sensor 24f and a first rear sensor 24r which are disposed in a longitudinal direction of the rotary ring, and a first upper sensor 24t and a first lower sensor 24b which are disposed in a vertical direction of the rotary ring. In addition, the second vehicle-outboard-side sensor member 22 includes a second front sensor 24f and a second rear sensor 24r which are disposed in a longitudinal direction of the rotary ring and a second upper sensor 24t and a second lower sensor 24b which are disposed in a vertical direction of the rotary ring.

Each of the eight displacement sensors 24 (f, r, t, and b) is formed by serially connecting a pair of coil elements 27 and 27 each having an independent detection surface with respect to the sensor target 4 and disposed adjacent to each other in a circumferential direction. The pair of coil elements 27 and 27 is formed by winding a coil around a pair of magnetic poles 28 protruding from the inner peripheral side of the sensor core 23. The magnetic poles 28 protrudes inward in a radial direction from the sensor core 23, and the radial inner end surface (detection surface) is opposed to the outer-peripheral-side surface of the sensor target 4 so as to have a radial gap therebetween.

Likewise, in the bearing H according to this embodiment, the first and second sensor members 21 and 22 which are distanced from each other in an axial direction and have four displacement sensors 24 disposed in a longitudinal direction and a vertical direction are integrally mounted to the sensor housing 16 to thereby form a sensor unit. Accordingly, upon assembling the bearing H, it is possible to attach all displacement sensors 24 to the outer ring 1 just by attaching the sensor housing 16 to the vehicle-inboard-side end of the outer ring 1. For this reason, it is not necessary to individually attach the displacement sensors 24 to the outer ring 1. Also, it is not necessary to form a sensor-attaching through hole in the outer ring 1.

In addition, since the displacement sensors 24 are positioned in a circumferential direction and a radial direction with respect to the sensor target 4 of the rotary ring by attaching the sensor housing 16 to the outer ring 1, it is not necessary to attach the displacement sensors 24 by adjusting the positions thereof. For this reason, it is easy to assemble the bearing H.

Since the displacement sensors 24 assembled in the sensor housing 16 are used to detect a gap with the deformation movement of the sensor target 4 positioned in the inner end of the rotary ring which has a deformation movement caused by an external force larger than the axial center portion (a portion close to the bearing center O shown in FIG. 1) of the rotary ring, it is advantageous in that the detection precision of the gap is improved.

In addition, in the case where the sensor attaching sensor housing 16 is attached to the vehicle-inboard-side end of the outer ring 1, since the displacement sensors 24 are disposed at a position comparatively far away from the flange portion 12 of the outer ring 1, the displacement sensors are hardly influenced by the torsion in the periphery of the flange portion 12. For this reason, it is advantageous in that the variation of the gap can be detected with high precision.

In this embodiment, the sensor housing 16, the sensor cores 23, the coil elements 27, and a wiring substrate 40 are sealed (molded) by a thermosetting resin such as an epoxy-based resin or an acryl-based resin or a thermoplastic resin such as PPS, PA, and ABS, where the wiring substrate is disposed on the sensor cores 23 so as to connect the coil elements to the lead wire used to output a detection signal. In other words, the displacement sensors 24 are coated by a synthetic resin so as to be integrally formed with the sensor housing 16. Accordingly, it is possible to strongly fix the wiring substrate 40 onto the sensor core 23, and thus to prevent the breakage of the electric element disposed on the wiring substrate 40 or the short-circuit state of the coil element 27 due to the vibration.

In addition, it is possible to prevent the case where the fixed screw used to fix the sensor cores 23 to the sensor housing 16 is loosened due to the vibration and the sensor is not properly operated due to the backlash of the sensor core 23. In addition, since the wiring substrate 40 is sealed, it is possible to prevent the short-circuit state of the wire due to the moisture caused by the condensation. Instead of the synthetic resin, a rubber-based material may be used to seal (mold) the wiring substrate 40 or the like.

In the case where the sensor housing 16 is formed of aluminum, alumina powders such as alumina hydroxide may be mixed with the rubber-based material or the synthetic resin used to coat the displacement sensors 24. In the case of the mixture of alumina, since the linear expansion coefficient of the synthetic resin or the rubber-based material can be approximated to the linear expansion coefficient of aluminum forming the sensor housing 16, it is possible to decrease the temperature expansion of the synthetic resin or the rubber-based material. Accordingly, it is possible to further prevent the axial deviation of the sensor housing 16 due to the expansion. In detail, in the case where an epoxy resin is used as a coating material, the linear expansion coefficient of the epoxy resin is $67 \times 10^{-6}/K$, which is comparatively larger than the linear expansion coefficient of iron ($12 \times 10^{-6}/K$) or aluminum ($23.1 \times 10^{-6}/K$). However, when the alumina hydroxide ($12.5 \times 10^{-6}/K$) is mixed with the epoxy resin so as to have a weight ratio of the alumina hydroxide 2 to the epoxy resin 3, the linear expansion coefficient of the coating material can be $34.3 \times 10^{-6}/K$. Accordingly, since the linear expansion coefficient can be approximated to the linear expansion coefficient of aluminum forming the sensor housing 16, it is possible to reduce the temperature expansion of the coating material.

Figure 6A:
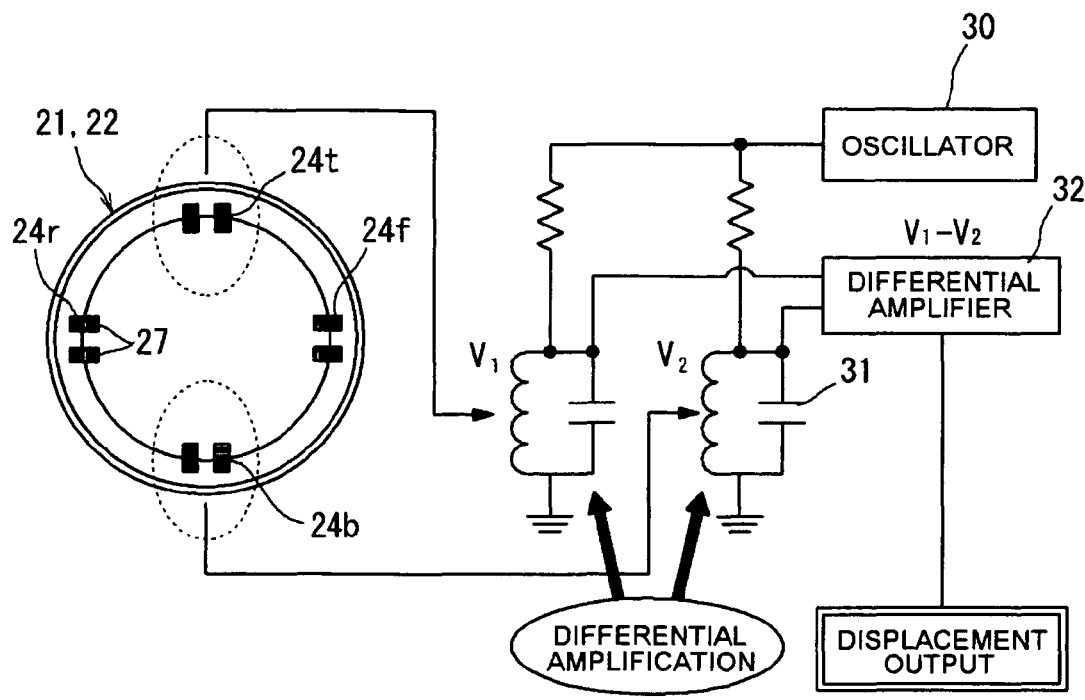
FIG. 6($a$) is a circuit diagram showing an example of a gap detection circuit using a sensor device and FIG. 6($b$) is an explanatory diagram showing a function of a coil element.

FIG. 6(a) shows an example of a gap detection circuit using the sensor device 14 according to this embodiment. As shown in the same drawing, among the displacement sensors 24 of the sensor members 21 and 22, the sensors 24t and 24b (the upper and lower sensors in FIGS. 6(a) and 6(b)) opposed to each other in a vertical direction are respectively connected to an oscillator 30, and an alternating current having a predetermined cycle is supplied form the oscillator 30 to the sensors 24t and 24b. In addition, the sensors 24t and 24b are connected in parallel to a synchronizing condenser 31.

In addition, in this embodiment, the output voltages (detection values) of the sensors 24t and 24b are made to have a difference by a differential amplifier 32, thereby obtaining the output voltage (detection value) corresponding to the displacement amount in a vertical direction and removing the temperature drift. Although it is not shown in the drawing, regarding the sensors opposed to each other in a horizontal direction, the temperature drift can be removed by making a difference using the differential amplifier in the same manner as described above.

In the inductance-type displacement sensor 24, assuming that an inductance of the coil is denoted by "L", an area of a detection surface is denoted by "A", a permeability is denoted by "μ", a coil winding number is denoted by "N", and an interval (gap) from the detection surface to the sensor target 4 is denoted by "x", the following equation (a) is satisfied.

$$L = A \times \mu \times N^2 / x \quad (a)$$

Accordingly, when the gap x of the sensor target 4 varies, the output voltage varies due to the varying inductance L of the displacement sensor 24. By detecting the variation of the output voltage, it is possible to detect a radial gap from the detection surface of the displacement sensor 24 to the sensor target.

Figure 6B:
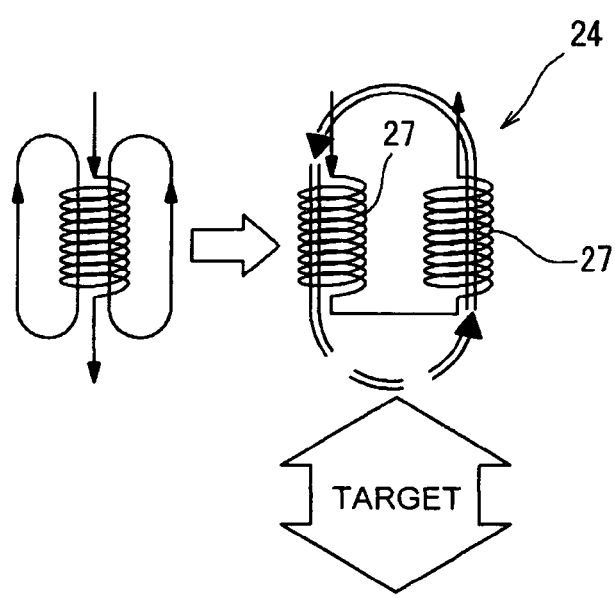

In this embodiment, since one displacement sensor 24 can be formed by serially connecting the pair of coil elements 27 each having an independent detection surface with respect to the sensor target 4, as shown in FIG. 6(b), the generated magnetic flux density is more improved compared with a case where one coil element 27 forms one displacement sensor 24. Accordingly, it is possible to further improve the detection sensitivity of the gap of the sensor target.

(Structure of Sensor Target)

As shown in FIGS. 1 and 2, the sensor target 4 is fitted and mounted to the outside of the vehicle-inboard-side end of the inner ring member 3 so as to be formed as a cylindrical member. The outer peripheral surface of the sensor target 4 is provided with a first detection portion 34 which is opposed to the detection surface (front end surface of the magnetic pole 28) of the first vehicle-inboard-side sensor member 21 and a second detection portion 35 which is opposed to the detection surface of the second vehicle-outboard-side sensor member 22. In this embodiment, the detection portions 34 and 35 are formed by first and second annular grooves which are formed in a circumferential direction of the sensor target 4.

As shown in FIG. 3, the first vehicle-inboard-side annular groove 34 is disposed so that a vehicle-outboard-side groove end surface 34a is disposed in the vicinity of the center of the detection surface A1 of the first sensor member 21. The second vehicle-outboard-side annular groove 35 is disposed so that a vehicle-inboard-side groove end surface 35a is disposed in the vicinity of the center of the detection surface A2 of the second sensor member 22.

For this reason, when the sensor target 4 of the rotary ring displaces by, for example, a distance 6 toward the vehicle-inboard side in an axial direction, in the vehicle-inboard side, an axial wrap length of the first sensor member 21 and the first annular groove 34 decreases, and a gap detection value of the first sensor member 21 decreases. In the vehicle-outboard side, an axial wrap length of the second sensor member 22 and the second annular groove 35 increases, and a gap detection value of the second sensor member 22 increases.

In the same manner, when the sensor target 4 of the rotary ring displaces by a distance 6 toward the vehicle-outboard side in an axial direction, the gap detection value of the first vehicle-inboard-side sensor member 21 increases, and the gap detection value of the second vehicle-outboard-side sensor member 22 decreases.

Likewise, in the case where the sensor target 4 according to this embodiment displaces in the same direction in an axial direction of the rotary ring, the pair of annular grooves 34 and 35 distanced from each other in an axial direction is provided on the outer peripheral surface so as to make a difference between the detection values detected by the first and second sensor members 21 and 22.

As described above, in the case where the rotary ring displaces in the same axial direction, the annular grooves 34 and 35 are positioned in an axial direction with respect to the sensor so as to change the detection values detected by the sensor members 21 and 22 to be positive or negative.

Accordingly, as clearly shown in the detection value calculation method of the control device described below, it is possible to amplify the detection value with respect to the unit of the axial translation amount of the rotary ring by making a difference between the detection values detected by the first vehicle-inboard-side sensor member 21 and the second vehicle-outboard-side sensor member 22. Accordingly, it is possible to improve the axial displacement detection sensitivity of the sensor device as a whole.

On the contrary to the arrangement shown in FIG. 3, the first vehicle-inboard-side annular groove 34 may be deviated toward the vehicle-outboard side with respect to the detection surface A1 of the first sensor member 21, and the second vehicle-outboard-side annular groove 35 may be deviated toward the vehicle-inboard side with respect to the detection surface A2 of the second sensor member 22. In this case, it is possible to obtain the above-described advantage.

The displacement sensors 24 forming the first and second sensor members 21 and 22 are connected to the control device 37 formed by a vehicle-body-side ECU or the like via a signal line 36 (see FIG. 5) penetrating the lid member 53. The output voltages (detection value) obtained by the sensors are calculated by the calculation method described later using the control device 37. Accordingly, it is possible to obtain a moment load and a translation load acting on the vehicle wheel in respective directions.

(Calculation Method of Respective Loads)

Figure 12:
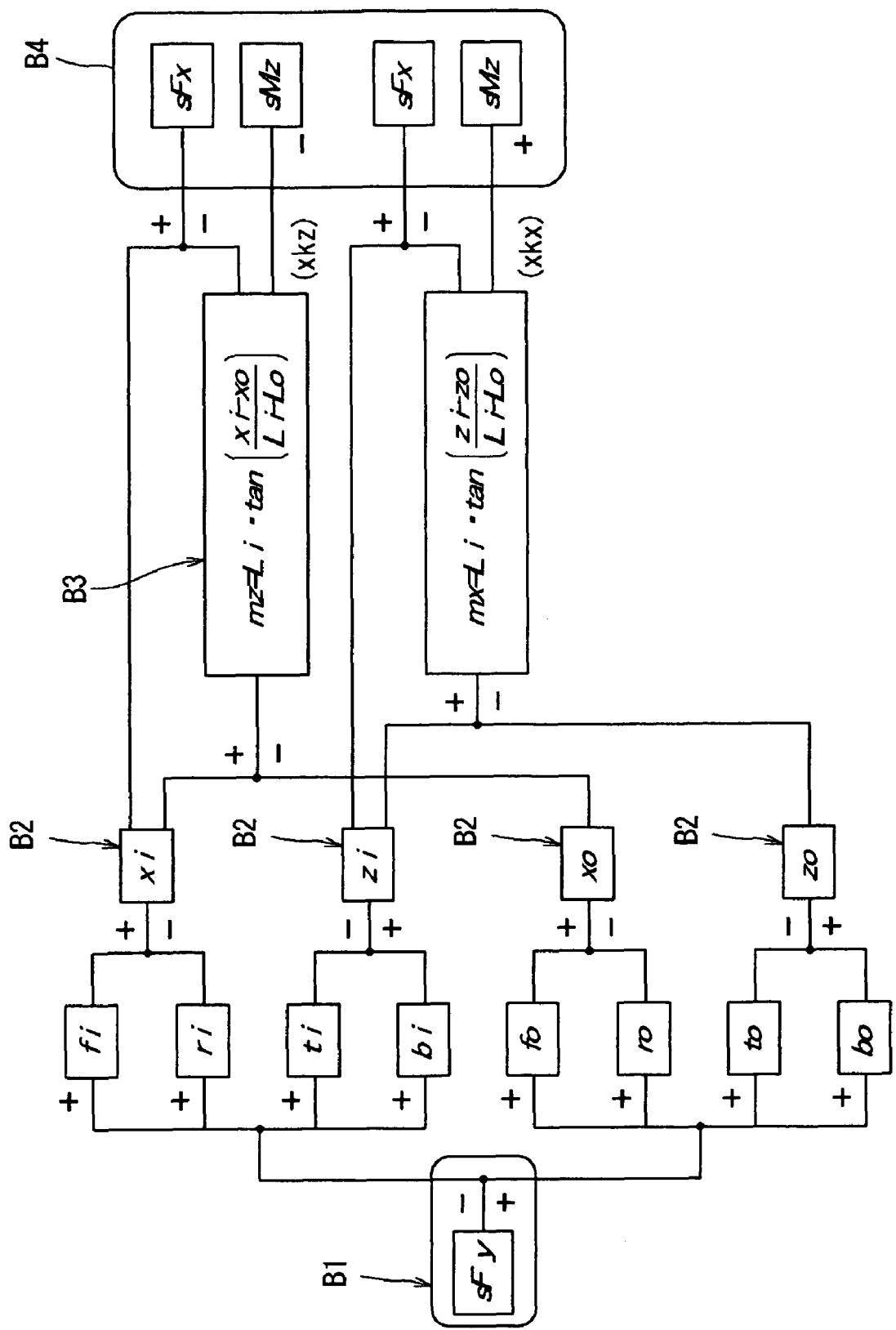
FIG. 12 is a block diagram showing a calculation method in controller.

Hereinafter, a load calculation method carried out by the control device 37 will be described with reference to FIGS. 7(a) to 14. In addition, FIG. 12 is a block diagram showing a calculation method using the control device 37.

(Definition of Direction and Sensor Detection Value)

As shown in FIG. 14, a longitudinal horizontal direction of the vehicle wheel indicates an x-axis direction, a transverse horizontal direction (axial direction) of the vehicle wheel indicates a y-axis direction, and a vertical direction of the vehicle wheel indicates a z-axis direction.

Figure 7B:
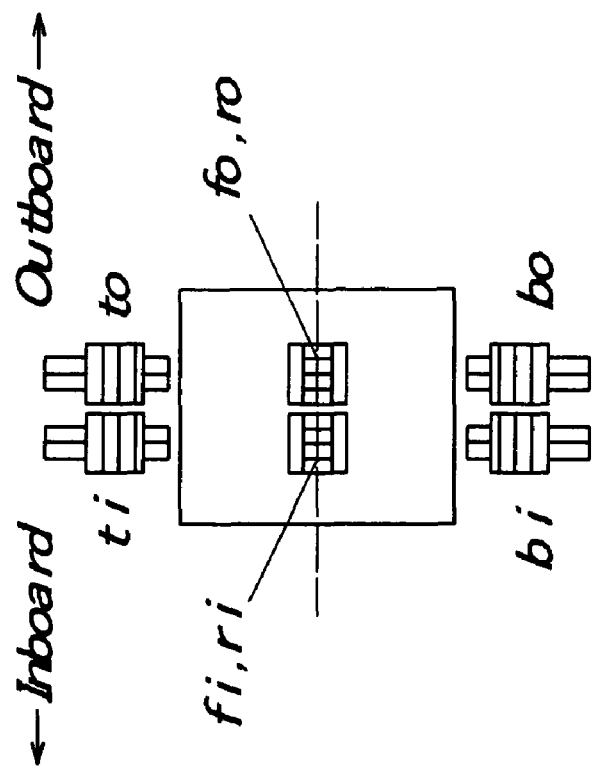
FIGS. 7($a$) and 7($b$) are diagrams showing arrangement positions of the displacement sensors and the definition of its detection values.
Figure 7A:
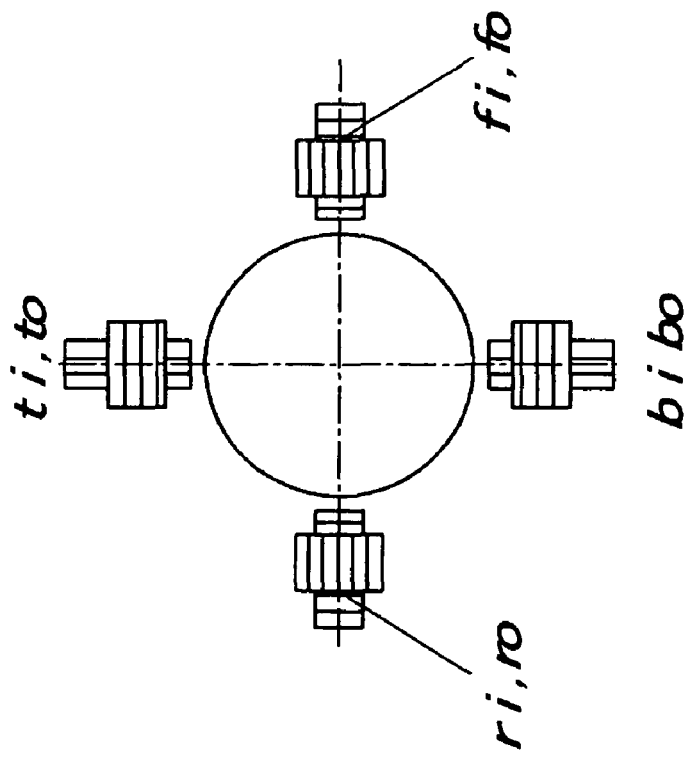

In addition, as shown in FIGS. 7(a) and 7(b), the suffix "i" is used to indicate the detection value of the vehicle-inboard-side sensor (first sensor member 21), and the suffix "o" is used to indicate the detection value of the vehicle-outboard-side sensor (second sensor member 22). The detection value of the front sensor is denoted by "f (front)", the detection value of the rear sensor is denoted by "r (rear)", the detection value of the upper sensor is denoted by "t (top)", and the detection value of the lower sensor is denoted by "b (bottom)".

Accordingly, the detection values of the total eight sensors provided in the first and second sensor members 21 and 22 are defined as below.

$f_i$: the detection value of the first front sensor
$r_i$: the detection value of the first rear sensor
$t_i$: the detection value of the first upper sensor
$b_i$: the detection value of the first lower sensor
$f_o$: the detection value of the second front sensor
$r_o$: the detection value of the second rear sensor
$t_o$: the detection value of the second upper sensor
$b_o$: the detection value of the second lower sensor (Independent Variable (sFy) corresponding to Y-axis Translation Load Fy)

Figure 8B:
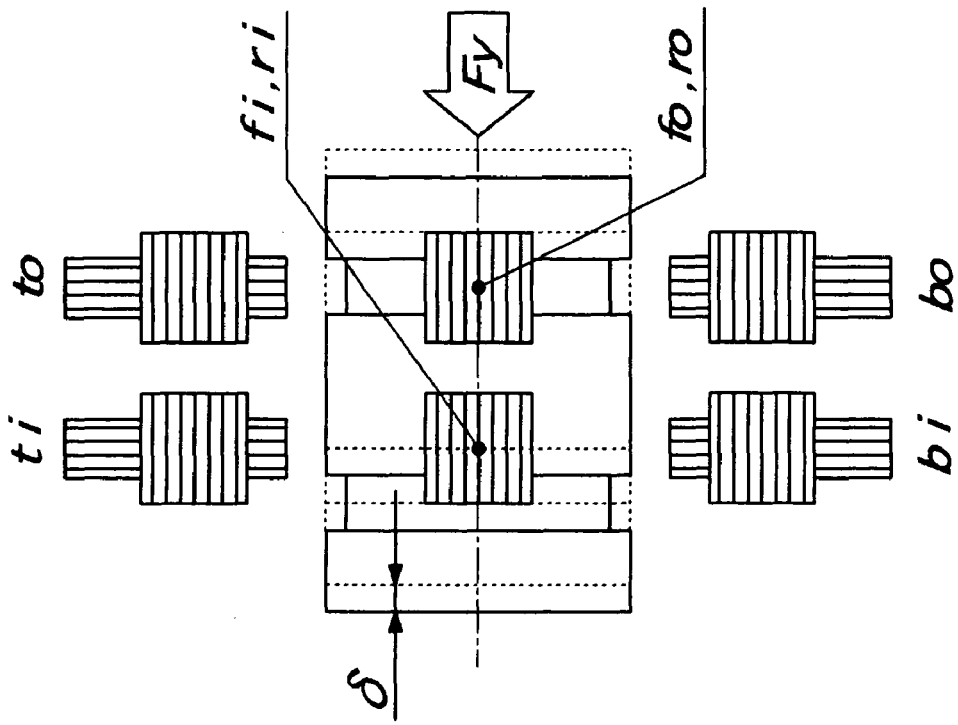
FIG. 8($a$) is a graph showing a calculation method of sXy and FIG. 8($b$) is a diagram showing a deformation movement of a rotary ring due to a load Fy.
Figure 8A:
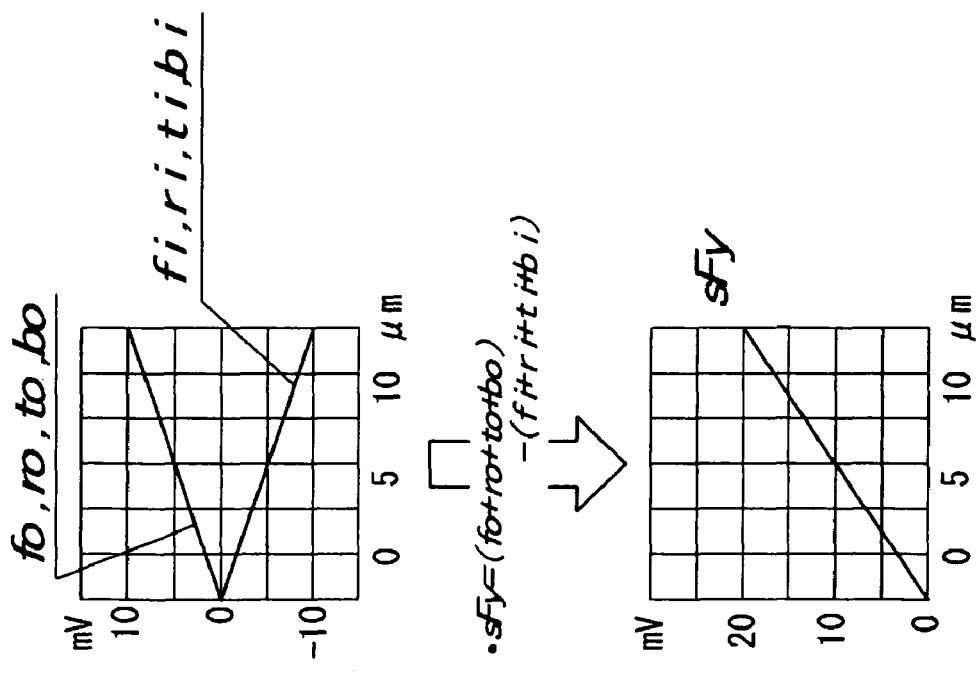

As shown in FIG. 8(b), in the case where the y-axis translation load Fy acts on the vehicle wheel, the rotary ring displaces in the direction of the load and the positions of the annular grooves 34 and 35 are deviated from each other in an axial direction. For this reason, as described above, all detection values (output voltages in this embodiment) $f_i$, $r_i$, $t_i$, $b_i$ of the vehicle-inboard-side sensors decrease in accordance with the increase of the axial movement amount 6. All detection values $f_o$, $r_o$, $t_o$, $b_o$ of the vehicle-outboard-side sensors increase in accordance with the increase of the axial movement amount 6.

Therefore, as shown in FIG. 8(b), "sFy" calculated by the following equation (1) is adopted as the independent variable corresponding to the y-axis translation load Fy (see the calculation block B1 in FIG. 12).

$$sFy = (f_i + r_i + t_i + b_i) - (f_o + r_o + t_o + b_o) \quad (1)$$

Likewise, when the detection values of the vehicle-inboard-side sensor and the vehicle-outboard-side sensor are allowed to have a difference therebetween, the sFy with respect to the unit of the axial translation amount of the rotary ring is amplified, thereby improving the axial displacement detection sensitivity of the sensor device 14 as a whole.

(X-axis Displacement and Z-Axis Displacement)

As shown in the calculation block B2 in FIG. 12, regarding the x-axis direction, the x-axis displacement detection value is obtained by the difference between the detection value f of the front sensor and the detection value r of the rear sensor. Regarding the z-axis direction, the z-axis displacement detection value is obtained by the difference between the detection value t of the upper sensor and the detection value b of the lower sensor.

Since the temperature influence occurs by the same amount in the same direction between the outputs of the front and rear sensors and between the outputs of the upper and lower sensors, it is possible to remove the temperature drift by making the difference as described above.

In this embodiment, since the displacement sensors 24 are disposed in the vehicle-inboard side and the vehicle-outboard side, it is possible to obtain the x-axis displacement detection value and the z-axis displacement detection value at the positions of the vehicle-inboard side and the vehicle-outboard side as below.

The x-axis displacement detection value of the vehicle-inboard side is $x_i = f_i - r_i$.

The z-axis displacement detection value of the vehicle-inboard side is $z_i = -t_i + b_i$.

The x-axis displacement detection value of the vehicle-outboard side is $x_o = f_o - r_o$.

The z-axis displacement detection value of the vehicle-outboard side is $z_o = -t_o + b_o$.

(Independent Variable (sMz) corresponding to Z-axis Rotation Moment Load Mz)

Figure 9:
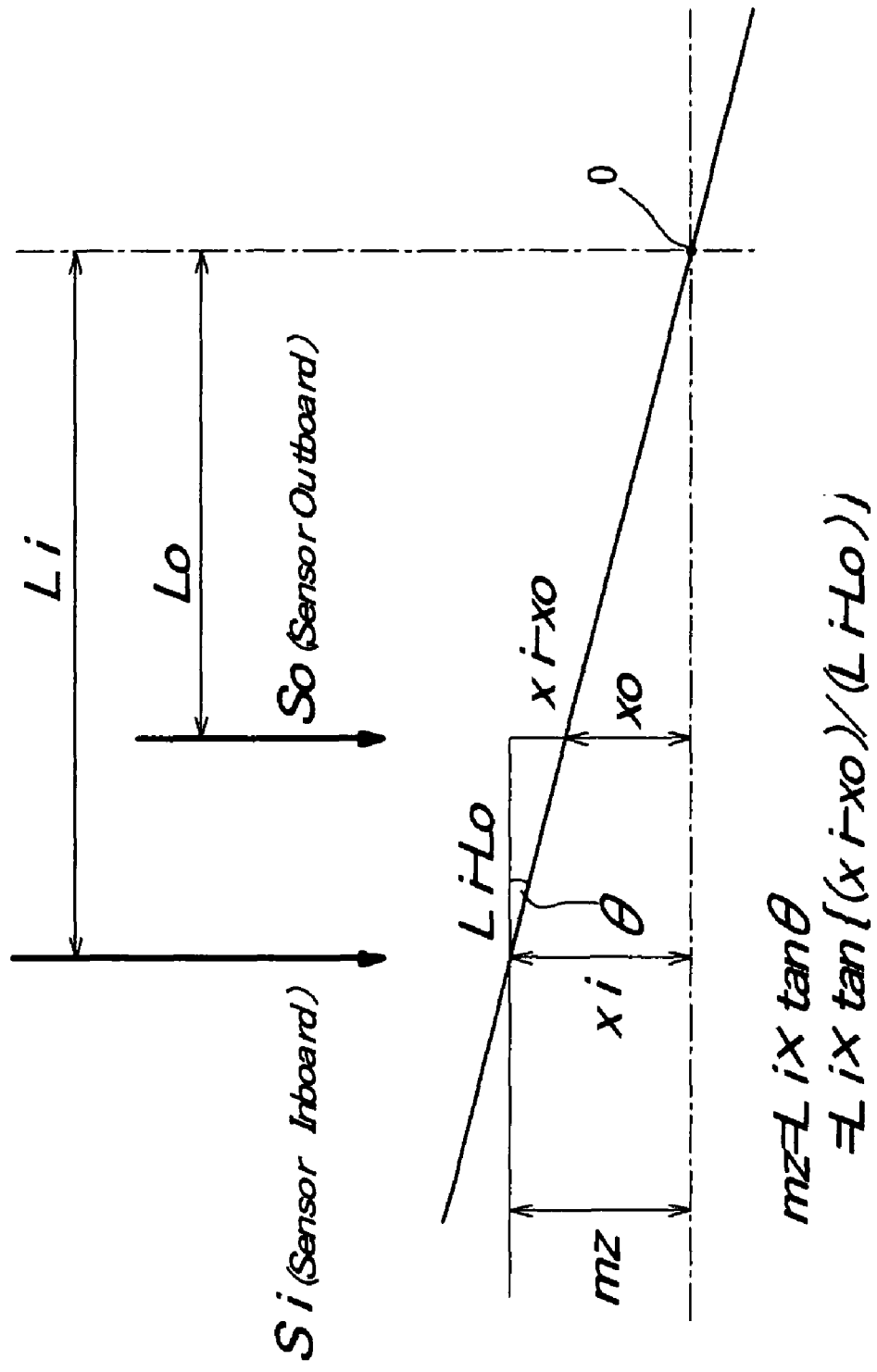
FIG. 9 is a diagram showing a deformation state of the rotary ring in a pure moment state.

Next, as shown in FIG. 9, a pure moment state in which only the z-axis rotation moment load Mz acts is assumed.

In this case, assuming that an axial distance from the bearing center O to the detection position of the vehicle-inboard-side sensor (first sensor member 21) is denoted by "$L_i$" and an axial distance from the bearing center O to the detection position of the vehicle-outboard-side sensor (second sensor member 22) is denoted by "$L_o$", the detection value corresponding to the z-axis rotation moment load Mz can be theoretically obtained by mz calculated by the following equation. The mz is equal to the $x_i$ in the case where θ is sufficiently small.

$$mz = L_i \times \tan\theta = L_i \times \tan((x_i - x_o)/(L_i - L_o))$$

However, in fact, since the sensor target 4 is provided with the annular grooves 34 and 35, as shown in FIG. 11(a), the mz is not equal to the $x_i$. FIG. 11(a) is a line graph showing a relationship among the detection values of the Mz, mz, and $x_i$ in the case where only the z-axis rotation moment load Mz acts. Likewise, the gradients of the line graphs of the detection values of the mz and $x_i$ are not equal to each other.

Therefore, as shown in FIG. 11(c), a correction coefficient kz, which is obtained by dividing the gradient of the line $x_i$ by the gradient of the line mz, is introduced in order to allow the gradients thereof to be equal to each other. Accordingly, as shown in the following equation (2), an independent variable sMz corresponding to the z-axis rotation moment load Mz is obtained by multiplying the correction coefficient kz by the mz (see the calculation blocks B3 and B4 in FIG. 12). In addition, the right "−" is used to have the same sign as those of other independent variables (the sFy and sMx described below).

$$sMz = -mz \times kz \quad (2)$$

(Independent Variable (sMx) corresponding to X-axis Rotation Moment Load Mx)

The x-axis direction and the z-axis direction have a relationship in which the coordinate is changed by 90° therebetween. Accordingly, the independent variable sMx corresponding to the x-axis rotation moment load Mx can be calculated by the following equation (3) in the same manner as the case of the sMz.

$$sMx = mx \times kx \quad (3)$$

In addition, in the equation (3), the kx is a correction coefficient introduced for the same purpose as that of the kz and is a correction coefficient obtained by dividing the gradient of the line $z_t$ by the gradient of the line mx (see FIGS. 11(b) and 11(c)).

(Independent Variable (sFz) corresponding to Z-axis Translation Load Fz)

(Independent Variable (sFx) corresponding to X-axis Translation Load Fx)

Figure 10:
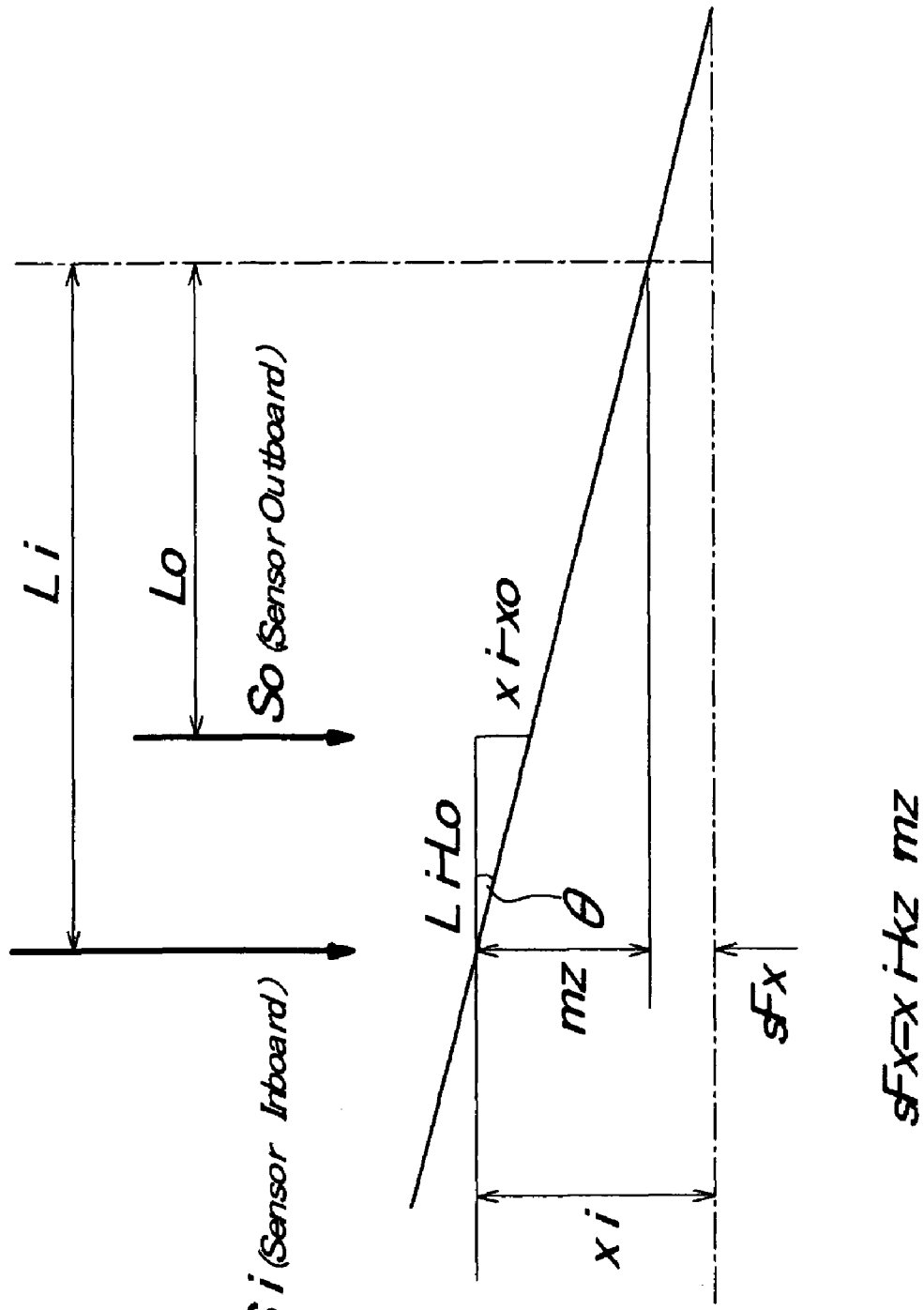
FIG. 10 is a diagram showing a deformation state of the rotary ring in the case where a moment load and a translation load act.

Next, as shown in FIG. 10, it is assumed that the x-axis translation load Fx acts together with the z-axis rotation moment load Mz.

In this case, the x-axis displacement detection value $x_i$ of the vehicle-inboard side includes a component of the independent variable sMz corresponding to the z-axis rotation moment load Mz and a component of the independent variable sFx corresponding to the x-axis translation load Fx. Accordingly, the independent variable sFx corresponding to the x-axis translation load Fx can be obtained by subtracting the sMz from the $x_i$.

In addition, the same applies to the case of the independent variable sFz corresponding to the z-axis translation load Fz.

Accordingly, the independent variable sFz using the z-axis translation load Fz and the independent variable sFx using the x-axis translation load Fx can be obtained by the following equations (4) and (5) (see the calculation block B4 in FIG. 12).

$$sFz = z_i - mx \times kx \quad (4)$$

$$sFx = x_i - mz \times kz \quad (5)$$

Figure 13:
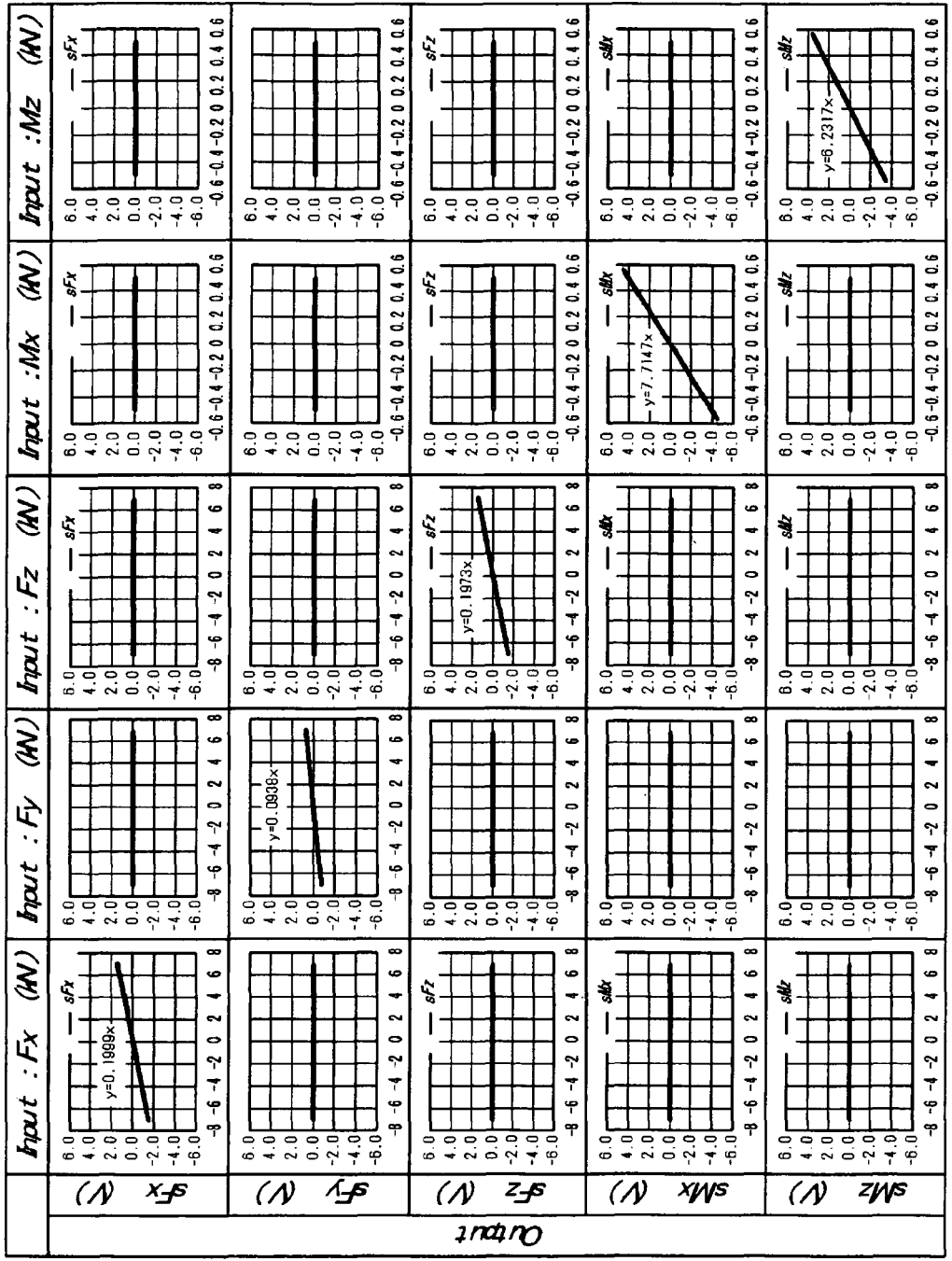
FIG. 13 is a matrix diagram showing a corresponding relationship between an independent variable calculated by a sensor output and an actual load acting on a vehicle wheel.

FIG. 13 is a matrix diagram showing a corresponding relationship between the independent variables sFx, sFy, sFz, sMx, and sMz obtained by the equations (1) to (5) and the actual loads Fx, Fy, Fz, Mx, and Mz acting on the vehicle wheel.

That is, the Fx, Fy, Fz, Mx, and Mz actually applied to the vehicle wheel are used as an input, and the independent variables sFx, sFy, sFz, sMx, and sMz obtained by the equations (1) to (5) are used as an output, thereby obtaining a matrix of the line graph between the variables.

As shown in the matrix in FIG. 13, in the case of the Fx, a line graph is obtained in which only the sFx has a gradient. In the case of Fy, Fz, Mx, and Mz, there are no reactions. In the same manner, the opposite angle part of the matrix is a line graph.

Accordingly, the five independent variables sFx, sFy, sFz, sMx, and sMz have a linear independent relationship with the five components Fx, Fy, Fz, Mx, and Mz as the actual load acting on the vehicle wheel.

For this reason, when the independent variables sFx, sFy, sFz, sMx, and sMz are obtained, the five loads Fx, Fy, Fz, Mx, and Mz acting on the vehicle wheel can be calculated by solving five simultaneous linear equations in five unknowns (Fx, Fy, Fz, Mx, and Mz).

In this embodiment, the control device 37 including the ECU or the like is equipped with a calculation circuit (hardware) or a control program (software) for solving the equations (1) to (5) and the five simultaneous linear equations. For this reason, on the basis of the eight detection values $f_i$, $r_i$, $t_i$, $b_i$, $f_o$, $r_o$, $t_o$, and $b_o$ of the sensors, it is possible to obtain the actual loads Fx, Fy, Fz, Mx, and Mz acting on the vehicle wheel.

Figure 15:
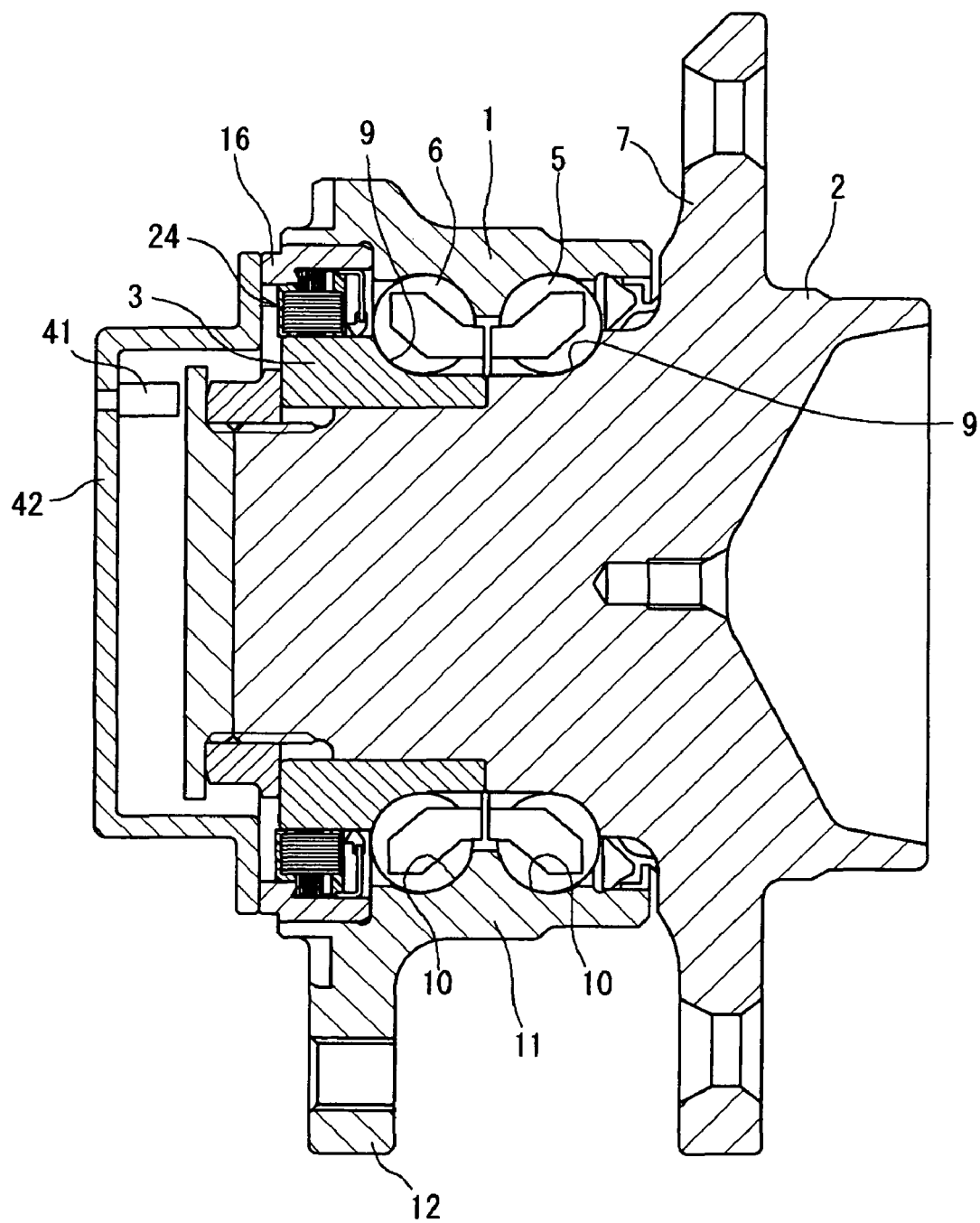
FIG. 15 is an axial sectional view showing the bearing according to another embodiment of the invention.

FIG. 15 is a view showing the bearing according to another embodiment of the invention. The displacement sensors 24 according to this embodiment have a single-row arrangement. The vehicle-inboard-side end of the bearing is shielded by a lid member 42 provided with axial displacement sensors 41 which detect a gap with respect to the axial end surface of the vehicle-inboard-side end of the rotary ring. In addition, the same reference numerals are given to the same configurations or components according to the embodiment shown in FIG. 1, and the descriptions thereof are for the simplicity.

In this embodiment, the displacement sensors 24 have a single-row arrangement. In addition, since the press-fitting length of the vehicle-outboard-side end of the sensor housing 16 is sufficient, the lid member 42 is not fitted to the outside of the vehicle-inboard-side end of the sensor housing 16. However, like the embodiment shown in FIG. 1, the lid member 42 which is harder than the sensor housing 16 may be fitted to the outside of the vehicle-inboard-side end of the sensor housing 16. In addition, in the embodiment shown in FIG. 15, the displacement sensors 24 have a single-row arrangement, and the axial length of the detection portion using the displacement sensor 24 is not required. Accordingly, the sensor target 4 is omitted, and the displacement sensor 24 is configured to detect a gap with respect to the outer peripheral surface of the inner ring member 3.

Next, as shown in FIG. 15, in the bearing including the single-row displacement sensors 24 and the axial displacement sensors 41, the load calculation method will be described.

The displacement sensors 24 are disposed at four positions in a circumferential direction (two positions in a vertical direction and two positions in a longitudinal direction). Meanwhile, the axial displacement sensors 41 are disposed at two positions in a vertical direction.

In the bearing having the sensors disposed therein, when the relationship between the acting load (tire force) and the displacement of the rotary ring is obtained in advance, it is possible to obtain the load. That is, by the displacement sensors, it is possible to calculate the components (Fsx, Fsy, Fsz, Msx, and Msz) of the load acting on the rotary ring in the x-axis, y-axis, and z-axis directions.

The longitudinal displacement sensors, the vertical displacement sensors, and the vertical axial displacement sensors are connected to a calculation processing part (not shown). The calculation processing part may be configured as controller (ECU) mounted to the vehicle body so as to calculate the outputs of the displacement sensors.

Figure 16:
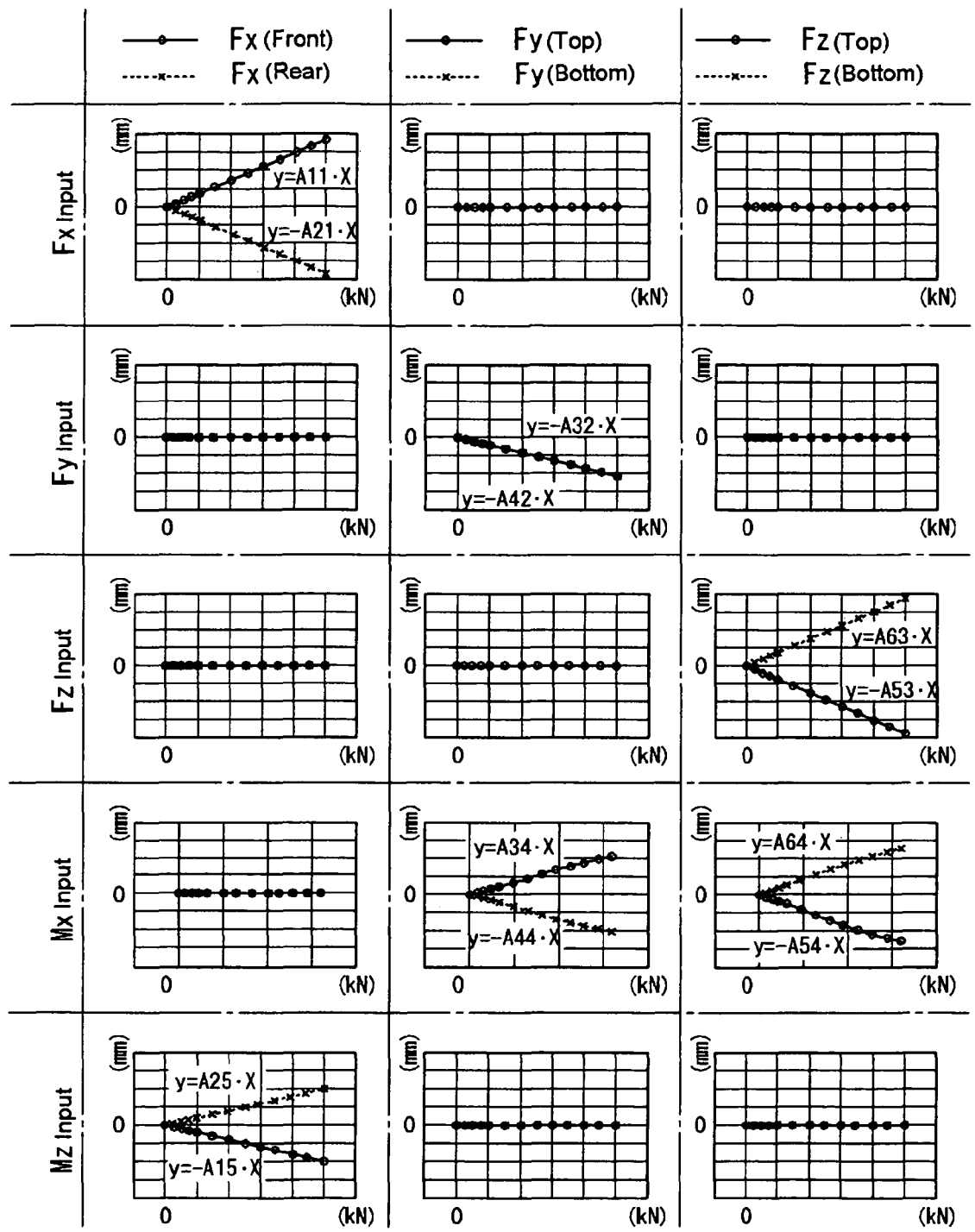
FIG. 16 is a graph showing the displacement of the rotary ring obtained from the output values of the displacement sensors in the case where a force moment acts on the vehicle wheel mounted to the rotary ring.

FIG. 16 shows the displacement of the rotary ring obtained from the output values of the displacement sensors in the case where a force moment acts on the vehicle wheel mounted to the rotary ring. That is, FIG. 16 shows the graphs of the displacements of the rotary ring obtained by the detection values (gap) of the longitudinal displacement sensors, the vertical axial displacement sensors, and the vertical displacement sensors in the case where the load acting on the vehicle wheel is the x-axis load (Fx input), the y-axis load (Fy input), and z-axis load (Fz input) and the moment is the x-axis rotation moment (Mx input) and the z-axis rotation moment (Mz input).

In addition, a general expression in which FIG. 16 is shown (summarized) as a determinant is the equation (6). The matrix M of the determinant obtained by the result in FIG. 16 is obtained as the expression 2. That is, in the equations (6) and (7), the relationship between the displacement sensors and the load moments in the respective directions is shown as the determinant. In addition, in the equation (8), the inverse matrix $M^{-1}$ of the matrix M is obtained. By the calculation of the equation (9) using the values obtained by the displacement sensors and the inverse matrix $M^{-1}$, it is possible to obtain the axial components (Fsx, Fsy, Fsz, Msx, and Msz) acting on the vehicle wheel (rotary ring).

[Expression 1]

$$\begin{pmatrix} F_{x(Front)} \\ F_{x(Rear)} \\ F_{y(Top)} \\ F_{y(Bottom)} \\ F_{z(Top)} \\ F_{z(Bottom)} \end{pmatrix} = M \cdot \begin{pmatrix} F_x \\ F_y \\ F_z \\ M_x \\ M_z \end{pmatrix} \quad (6)$$

Here:

$$M = \begin{pmatrix} m11 & m12 & m13 & m14 & m15 \\ m21 & m22 & m23 & m24 & m25 \\ m31 & m32 & m33 & m34 & m35 \\ m41 & m42 & m43 & m44 & m45 \\ m51 & m52 & m53 & m54 & m55 \\ m61 & m62 & m63 & m64 & m65 \end{pmatrix}$$

[Expression 2]

$$M = \begin{pmatrix} A_{11} & 0 & 0 & 0 & -A_{15} \\ -A_{21} & 0 & 0 & 0 & A_{25} \\ 0 & -A_{32} & 0 & A_{34} & 0 \\ 0 & -A_{42} & 0 & -A_{44} & 0 \\ 0 & 0 & -A_{53} & -A_{54} & 0 \\ 0 & 0 & A_{63} & A_{64} & 0 \end{pmatrix} \quad (7)$$

[Expression 3]

$$M^{-1} = \begin{pmatrix} B_{11} & -B_{11} & 0 & 0 & 0 & 0 \\ 0 & 0 & -B_{23} & -B_{24} & 0 & 0 \\ 0 & 0 & -B_{33} & -B_{34} & -B_{35} & -B_{36} \\ 0 & 0 & B_{43} & B_{44} & 0 & 0 \\ -B_{51} & B_{52} & 0 & 0 & 0 & 0 \end{pmatrix} \quad (8)$$

[Expression 4]

$$\begin{pmatrix} F_{sx} \\ F_{sy} \\ F_{sz} \\ M_{sx} \\ M_{sz} \end{pmatrix} = \begin{pmatrix} B_{11} & -B_{11} & 0 & 0 & 0 & 0 \\ 0 & 0 & -B_{23} & -B_{24} & 0 & 0 \\ 0 & 0 & -B_{33} & -B_{34} & -B_{35} & -B_{36} \\ 0 & 0 & B_{43} & B_{44} & 0 & 0 \\ -B_{51} & B_{52} & 0 & 0 & 0 & 0 \end{pmatrix} \begin{pmatrix} F_{x(Front)} \\ F_{x(Rear)} \\ F_{y(Top)} \\ F_{y(Bottom)} \\ F_{z(Top)} \\ F_{z(Bottom)} \end{pmatrix} \quad (9)$$

According to the displacement sensors and the calculation processing portion, it is possible to calculate the axial components (Fsx, Fsy, Fsz, Msx, and Msz) of the load (tire force) acting on the vehicle wheel (rotary ring) by the calculation of the output values of the displacement sensors and the predetermined function (inverse matrix $M^{-1}$) stored in advance. In addition, since the displacement sensors 24 are symmetrically disposed in a vertical direction and a longitudinal direction with the central axis C interposed therebetween, it is not necessary to carry out the temperature correction by calculating the difference between the output values thereof.

The invention claimed is:

1. A vehicle-wheel rolling bearing comprising:
a cylindrical fixed ring which is fixed to a vehicle body;
a rotary ring which is inserted through the fixed ring so as to be rotatable therein; and
plural rows of rolling elements which are disposed between the fixed ring and the rotary ring so as to roll,
wherein a vehicle-outboard-side end of an annular sensor housing, having a plurality of displacement sensors disposed in a circumferential direction so as to detect a gap with respect to an outer peripheral surface of a vehicle-inboard-side end of the rotary ring, is press-fitted to an inner peripheral surface of a vehicle-inboard-side end of the fixed ring, and
wherein the displacement sensors are coated by a synthetic resin or a rubber-based material and is integrally formed with the sensor housing.

2. The vehicle-wheel rolling bearing according to claim 1, wherein the sensor housing is formed of aluminum and the synthetic resin or the rubber-based material is mixed with alumina powders.

3. The vehicle-wheel rolling bearing according to claim 1, wherein a lid member which is formed of a material harder than the sensor housing is fitted to the outside of a vehicle-inboard-side end of the sensor housing.

4. The vehicle-wheel rolling bearing according to claim 2, wherein a lid member which is formed of a material harder than the sensor housing is fitted to the outside of a vehicle-inboard-side end of the sensor housing.

* * * * *